United States Patent [19]

Brandstetter et al.

[11] Patent Number: 4,727,571

[45] Date of Patent: Feb. 23, 1988

[54] CIRCUIT FOR SURGE VOLTAGE PROTECTION IN ELECTRONIC TELEPHONE STATIONS

[75] Inventors: Alfred Brandstetter; Juergen Riesmeyer, both of Olching, Fed. Rep. of Germany

[73] Assignee: Siemens Aktiengesellschaft, Berlin and Munich, Fed. Rep. of Germany

[21] Appl. No.: 921,562

[22] Filed: Oct. 21, 1986

[30] Foreign Application Priority Data

Oct. 25, 1985 [DE] Fed. Rep. of Germany ....... 3538088

[51] Int. Cl.⁴ ............................................. H04M 1/00
[52] U.S. Cl. .................................... 379/362; 379/351; 379/412; 361/119
[58] Field of Search ............... 379/351, 362, 387, 412; 361/119, 82, 84, 91

[56] References Cited

U.S. PATENT DOCUMENTS

| | | | |
|---|---|---|---|
| 4,132,870 | 1/1979 | Liv | 379/412 X |
| 4,164,632 | 8/1979 | Aagaard | 379/412 X |
| 4,198,547 | 4/1980 | Ferraro | 379/362 X |
| 4,306,119 | 12/1981 | Kutzavitch | 379/412 X |
| 4,309,574 | 1/1982 | Sublette et al. | 379/387 X |
| 4,313,037 | 1/1982 | Shepard | 379/387 X |
| 4,329,546 | 5/1982 | Montesi et al. | 379/387 |
| 4,360,710 | 11/1982 | Chaput et al. | 379/412 X |
| 4,388,499 | 6/1983 | Janssen | 379/362 |
| 4,555,597 | 11/1985 | Boeckmann et al. | 379/351 |
| 4,636,588 | 1/1987 | Nakayama | 379/362 |

FOREIGN PATENT DOCUMENTS

| | | | |
|---|---|---|---|
| 0137396 | 4/1985 | European Pat. Off. | 379/412 |
| 2541942 | 3/1977 | Fed. Rep. of Germany | 379/412 |
| 3407202 | 8/1985 | Fed. Rep. of Germany | |
| 3407226 | 8/1985 | Fed. Rep. of Germany | |
| 255004 | 5/1985 | France | 379/412 |

OTHER PUBLICATIONS

Siemens Halbleiter, Apr. 1965, pp. 86 and 87.

Primary Examiner—Jin F. Ng
Assistant Examiner—Matthew E. Connors
Attorney, Agent, or Firm—Mark H. Jay

[57] ABSTRACT

A circuit for surge voltage protection of therefor a telephone station has first and second input terminals for receiving a DC supply voltage via a two-wire subscriber line. Both terminals are shunted via a varistor. In parallel with the varistor is an element for protecting the circuit against polarity reversals. This element has two outputs, one of them carries the positive potential of the DC supply voltage and both of them are connected with respective terminals of the actual station circuit. A V-MOS or bipolar tranistor is arranged between the one output and the associated station circuit terminal. This transistor belongs to a current limiting circuit and serves also as a dialswitch-pulsing contact. The transistor circuit contains two further transistors and a number of dimensioning resistors. The positive output of the protection element is connected to the keyboard-sided input of the transistor circuit via a series network formed by a reverse Zener-diode and a resistor. The breakdown voltage of the this network is below the voltage at which the varistor becomes operative.

4 Claims, 6 Drawing Figures

CIRCUIT FOR SURGE VOLTAGE PROTECTION IN ELECTRONIC TELEPHONE STATIONS

BACKGROUND OF THE INVENTION

The invention relates to electronic telephone stations. It relates in particular to a circuit for surge voltage protection in such stations, where the feed voltage is supplied via a two-wire subscriber line.

A known circuit of this kind includes a varistor, a polarity reversal protection device, a current limiting device, a transistor circuit, and a Zener diode. The varistor shunts the inputs of the circuit, and the polarity reversal protection device is connected in parallel with the varistor. That terminal of the polarity reversal protection device, which conducts the positive potential of the feed voltage, is connected with a first transistor of the current limiting device. If this transistor is, e.g. a V-MOS (or bipolar) transistor, it can also be used as a so-called "Dialswitch-Pulsing" contact. It is then driven—via a transistor circuit consisting of two additional transistors and biassing resistors—by the dialing pulse generated in a dialing keyboard. The Zener diode is connected in parallel with the actual station circuit comprising the essential electronic assemblies.

Both the Zener diode and the current limiting device, which could be connected in different ways between the polarity reversal protection device (e.g. a full-wave rectifier bridge) and the station circuit, protect the station against surge voltages. The current limiting device limits the input currents which can differ in magnitude on account of subscriber lines of unequal length, up to a maximum current for the station circuit. The varistor preceding the circuit arrangement in known manner provides an additional protection against temporary high voltages on the subscriber line which may be induced by external influences such as, for example, lightning.

However, the current limiting device can have relatively high tolerances and these tolerances are a function of the maximum feed current flowing to the station circuit. Thus, when high voltages (lightning) are input-coupled onto the subscriber line while the varistor is turned on, impermissibly high power losses can occur both across the V-MOS-transistor and across the Zener diode. In order to prevent their destruction or damage, components must be provided which can tolerate such power losses and are thus expensive.

It is therefore an object of this invention to provide a circuit for protecting a line-powered telephone station from surge voltages using components which need not be especially resistant to power losses but are nonetheless protected from destruction in the event of temporarily high surge voltages.

It is a further object of this invention to improve on devices of the art.

SUMMARY OF THE INVENTION

This invention is directed to a circuit for surge voltage protection in an electronic telephone station having a station circuit and a dialing keyboard. The circuit comprises first and second terminals connected across a two wire subscriber line and receiving a DC supply voltage therefrom. Said terminals are shunted by a means having an operational voltage above which it limits the voltage drop by a resistance breakdown. A means for protecting the circuit against polarity reversals is arranged in parallel with the voltage limiting means. The protecting means has first and second outputs, the first one carrying the positive potential of the DC supply voltage and both being connected with a respective terminal of the station circuit. The first output is connected with a first transistor which belongs to a current limiting circuit. The transistor is also used as a dialswitch-pulsing contact so that dialing pulses can be recognized in the remote exchange. For driving this transistor responsive to the dialing pulses, which are generated in the dialing keyboard, a drive circuit including two additional transistors and dimensioning resistors is provided. This circuit is connected between the first transistor and the dialing pulse output of the dialing keyboard. A first Zener diode is arranged in parallel to the terminals of the station circuit. The first output of the polarity reversal protecting means is connected with the dial pulse output of the dialing keyboard via a series network consisting of a dropping resistor and a second Zener diode in the blocking direction. The break-down voltage of this network is below the operating voltage of the voltage limiting means.

Such an arrangement is advantageous in that when a high voltage peak is input-coupled, the first transistor is turned off before the voltage limiting means—typically a varistor—becomes operative. Thus, this transistor and the Zener diode which is connected in parallel with the station circuit, are not overloaded with current and the transistor does not become conductive again until the voltage on the subscriber line has fallen below the break-down voltage of the series network.

According to a more specific aspect of the invention, the DC supply voltage is drawn from the mains, the first transistor has a turn-off voltage which is below the mains voltage and the operational voltage of the voltage limiting means exceeds the mains voltage. This embodiment has the additional advantage that even when the full mains voltage is connected to the subscriber line, the telephone station is protected in that the first transistor is blocked by the series network consisting of the second Zener diode and the dropping resistor, whereas the voltage limiting means is still unloaded.

The foregoing and other objects, features and advantages of the invention will be apparent from the following more particular description of a preferred embodiment of the invention, as illustrated in the accompanying drawings.

DETAILED DESCRIPTION

Figure 1:
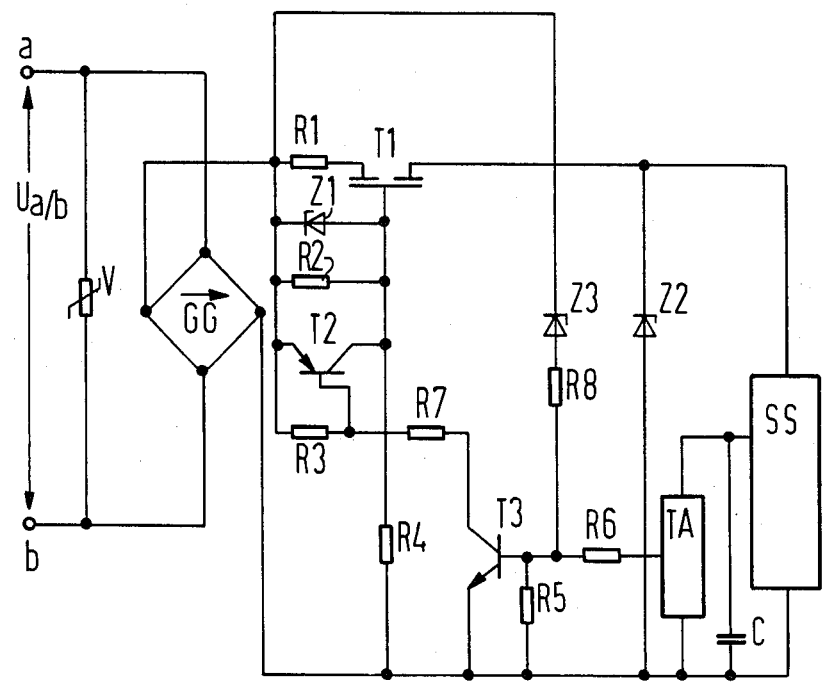
FIG. 1 is a block diagram of a cicuit according to the invention.

FIG. 1 represents a circuit in accordance with the invention. The circuit includes a varistor V, a polarity reversal device GG, a current limiting circuit consisting of a V-MOS transistor T1, a Zener diode Z1 and three biassing resistors R1, R2 and R4, a drive circuit consisting of transistors T2 and T3 and dimensioning resistors R3, R5, R6 and R7, a protective Zener diode Z2, a charging capacitor C, a keyboard TA, a station circuit SS, and a series network formed by a Zener diode Z3 and a dropping resistor R8. The drive circuit operates the transistor T1, and additional operation of this transistor is provided by the series network.

In operation, a DC voltage $U_{(a/b)}$ is received via wires a, b of the subscriber line. This DC voltage serves as feed voltage for the connected telephone station and will differ in value depending upon the length of the subscriber line.

In the present circuit, the transistor T1 is used as a dialswitch-pulsing contact in that it is brought into the turn-off state by the keyboard TA in accordance with the dialing pulses at its dialing pulse output. This is effected via the drive circuit with its transistors T2 and T3. Amplifier transistor T2 controls transistor T1 in its unsaturated state in dependance upon the potential before R1. In its on-state T2 supplies a blocking potential to the gate of the transistor T1. Transistor T3, whose base is driven by the keyboard TA via the resistor R6, acts as a switch transistor. It turns off T1 via T2, if the difference between the potentials before R1 and at the base of T3 exceeds the breakdown voltage of the series network.

Figure 2:
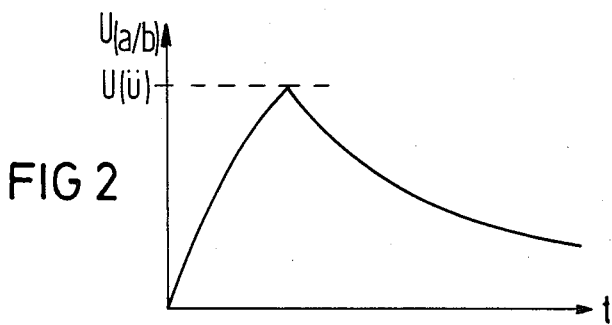
FIG. 2 represents the voltage between both circuit terminals in dependence upon the time, in case neither a voltage limiting means nor a series network is provided.
Figure 3:
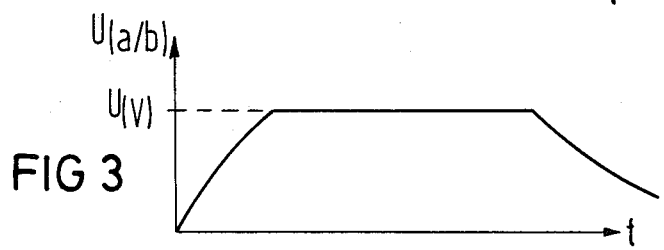
FIG. 3 depicts the time-dependent voltage between both circuit inputs, if a varistor but no series network is provided.

Varistor V, which acts as voltage limiting device above a specific voltage, shunts the circuit input to protect the telephone station from high voltages such as can be input-coupled, for example, in the event of lightning on the subscriber line. FIG. 2 represents an example of a high, instantaneously occurring voltage $U_{(a/b)}$ with a surge voltage peak $U_{(ü)}$ which is impermissible for the circuit arrangement. The varistor V limits this voltage to the voltage $U_{(V)}$ (FIG. 3).

Figure 4:
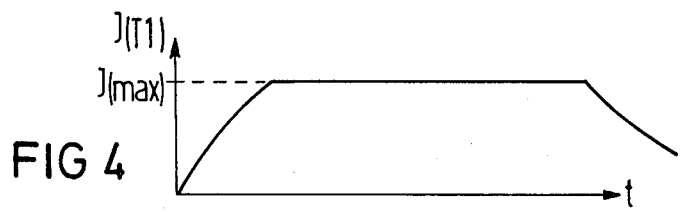
FIG. 4 shows the current through the first transistor and the first Zener diode, as a function of time, in case a varistor but no series network is provided.
Figure 5:
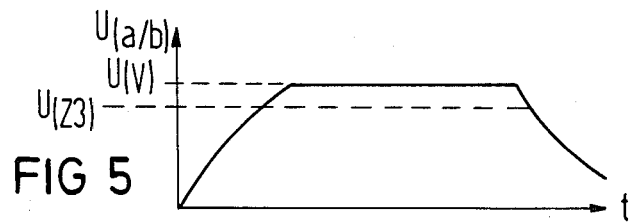
FIG. 5 shows the time-dependent voltage drop between both circuit terminals of the embodiment of FIG. 1.
Figure 6:
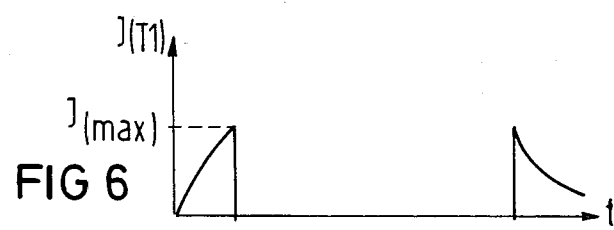
FIG. 6 shows the time-dependent current through the first transistor and the first Zener diode of the circuit shown in FIG. 1.

During the time while the varistor V is operating the transistor T1 and the Zener diode Z2 are loaded corresponding to the voltage $U_{(V)}$ with the maximum current strength $J_{(max)}$ (FIG. 4), and a relatively high power loss occurs in the two components. As these components are also subject to relatively high tolerances, it cannot be ruled out that they may be destroyed by the dissipated energy which they absorb. To prevent this, one could use components which are resistant to a high power loss and thus expensive, or reduce the power loss in these components. The latter can be achieved in a simple manner by connecting the control input of the aforementioned drive circuit, i.e. the base of the transistor T3, via dropping resistor R8 and Zener diode Z3 with the input of the current limiting circuit, i.e. between the potential reversal protection device GG and the transistor T1. If the combination of Zener diode Z3 and resistor R8 is selected to be such that the breakdown voltage $U_{(Z3)}$ of Z3 in the serial connection Z3, R8, is somewhat below the voltage $U_{(V)}$ at which the varistor V becomes operative (FIG. 5), then for the time during which $U_{(a/b)}$ is greater than $U_{(Z3)}$ the transistor T1 is blocked and $J_{(max)}$ behaves in accordance with FIG. 6. This serves to quite substantially reduce the power loss in T1 and Z2.

Having thus described the invention with particular reference to the preferred form thereof, it will be obvious to those skilled in the art to which the invention pertains, after understanding the invention, that variations, changes and modifications may be made therein without departing from the spirit and scope of the invention as defined by the claims appended hereto.

What is claimed is:

1. A circuit for surge voltage protection in an electronic telephone station having a station circuit and a dialing keyboard, comprising:
   (a) high and low terminals connected across a two-wire subscriber line and receiving a DC supply voltage therefrom;
   (b) voltage limiting means for shunting said high and low terminals in such a manner as to limit the voltage between said high and low terminals to a predetermined maximum value;
   (c) polarity reversal protection means for protecting the circuit against polarity reversals, said polarity reversal protection means being arranged in parallel to the voltage limiting means and having first and second ouptut terminals, each of said output terminals being connected with a respective terminal of the station circuit and the first output terminal leading the positive potential of the DC supply voltage;
   (d) current limiting means including a first transistor, said first transistor having a control electrode and having a main conduction path connected between the first output terminal and its respective terminal of the station circuit and said first transistor serving as a dialswitch-pulsing contact;
   (e) a drive circuit for driving the first transistor for controlling the degree of conduction of said main conduction path responsive to dialing pulses generated in the dialing keyboard, said drive circuit having a control input connected to a dialing pulse output of the dialing keyboard and an output connected to said control electrode of the first transistor;
   (f) a first Zener diode connected across the station circuit; and
   (g) a series network comprising a second Zener diode and a first dropping resistor, said series network having a predetermined breakdown voltage and being connected between the first output terminal of the polarity reversal protection means and said control input of the drive circuit; wherein the predetermined breakdown voltage is below the predetermined maximum value so that the main conduction path of the first transistor is not conductive during the time the voltage between said high and low terminals reaches the predetermined maximum value.

2. A circuit according to claim 1, wherein the current limiting means comprises a second dropping resistor connected between said first output terminal and said main conduction path of said first transistor and the drive circuit comprises a second transistor which drives the first transistor in its unsaturated state in dependance upon the potential at said first output terminal, and a third transistor which turns off the first transistor via the second one, when the predetermined breakdown voltage in the series network is reached.

3. A circuit according to claim 1, wherein the voltage limiting means is a varistor.

4. A circuit according to claim 1, wherein the first transistor has a cutoff voltage which is less than the nominal DC supply voltage, and the predetermined maximum value is higher than the nominal DC supply voltage.

* * * * *